US008896772B2

(12) United States Patent
Fraval et al.

(10) Patent No.: US 8,896,772 B2
(45) Date of Patent: Nov. 25, 2014

(54) OPTICAL VARIATION DEVICE, OPTICAL ASSEMBLY AND METHOD FOR MANUFACTURING SUCH A DEVICE

(75) Inventors: Nicolas Fraval, Brest (FR); Jean Louis De Bougrenet De La Tocnaye, Guilers (FR); Frédéric Berier, Plouarzel (FR)

(73) Assignee: Evosens, Plouzane (FR)

( * ) Notice: Subject to any disclaimer, the term of this patent is extended or adjusted under 35 U.S.C. 154(b) by 218 days.

(21) Appl. No.: 13/582,884

(22) PCT Filed: Mar. 18, 2011

(86) PCT No.: PCT/FR2011/050563
§ 371 (c)(1),
(2), (4) Date: Sep. 5, 2012

(87) PCT Pub. No.: WO2011/114076
PCT Pub. Date: Sep. 22, 2011

(65) Prior Publication Data
US 2012/0327351 A1   Dec. 27, 2012

(30) Foreign Application Priority Data

Mar. 19, 2010 (FR) ..................... 10 01091

(51) Int. Cl.
*G02F 1/1335* (2006.01)
*G02F 1/29* (2006.01)
*G02B 27/22* (2006.01)
*G02F 1/1343* (2006.01)

(52) U.S. Cl.
CPC ............... *G02F 1/292* (2013.01); *G02B 27/22* (2013.01); *G02F 2203/18* (2013.01); *G02F 2201/12* (2013.01); *G02F 2202/022* (2013.01); *G02F 1/13439* (2013.01)

USPC ............................................. 349/15; 349/200

(58) Field of Classification Search
USPC ............................................. 349/15, 200, 201
See application file for complete search history.

(56) References Cited

U.S. PATENT DOCUMENTS

| 5,493,427 | A  |   | 2/1996 | Nomura et al. |
| 7,773,489 | B2 | * | 8/2010 | Murata et al. ............ 369/112.02 |
| 7,894,123 | B2 | * | 2/2011 | Frazier ......................... 359/296 |
| 8,134,636 | B2 | * | 3/2012 | Lin et al. ....................... 348/345 |

FOREIGN PATENT DOCUMENTS

| EP | 0411975 A1 | 2/1991 |
| EP | 1785991 A1 | 5/2007 |

OTHER PUBLICATIONS

International Search Report for corresponding International Application No. PCT/FR2011/050563.

* cited by examiner

*Primary Examiner* — James Dudek
(74) *Attorney, Agent, or Firm* — Egbert Law Offices, PLLC

(57) ABSTRACT

An optical variation device includes a liquid-crystal element having optical properties that control the propagation of light and two substrate plates arranged on either side of the liquid-crystal element. The two substrate plates are covered respectively with first and second control electrodes. Each electrode has a substantially central opening referred to as the optical aperture. The device also has a layer of a material arranged between the electrodes and filling the optical aperture. The material has a surface resistivity of 10 kΩ/square to 10 GΩ/square and at least the first electrode is divided into a plurality of portions forming sub-electrodes suitable for simultaneously receiving different potentials.

16 Claims, 6 Drawing Sheets

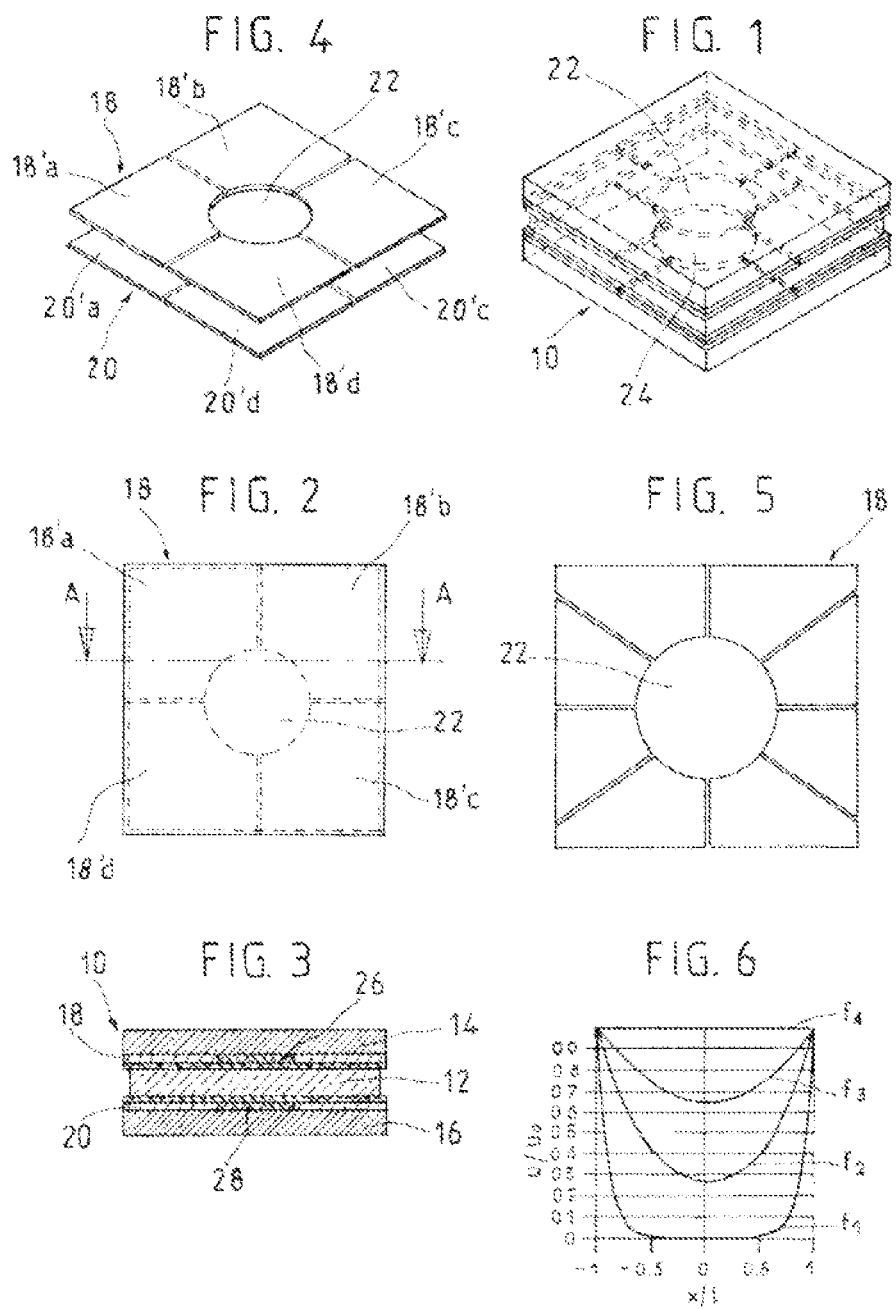

OPTICAL VARIATION DEVICE, OPTICAL ASSEMBLY AND METHOD FOR MANUFACTURING SUCH A DEVICE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to optically variable devices allowing the propagation of light to be controlled and the optical quality of an image displayed by a unit comprising such a device to be improved.

More particularly the invention relates to an optically variable device comprising a liquid-crystal element having optical properties controlling the propagation of light, and two substrate plates placed on either side of the liquid-crystal element, the two substrate plates being covered with a first and a second control electrode, respectively, each electrode bounding a substantially central orifice called an optical aperture, the device furthermore comprising a layer of a material placed between the electrodes and filling at least the optical aperture.

2. Description of Related Art Including Information Disclosed Under 37 CFR 1.97 and 37 CFR 1.98.

A device such as described above is known from document WO 2009/153764. More particularly, this document describes the use of a frequency-sensitive material, the conductivity of which changes when it is subjected to control signals of various frequencies. It is then possible to form a virtual lens in the liquid-crystal element, the focal length of which lens may be modified.

It is also known from the publication "Liquid-crystal adaptive lenses with modal control" [Naumov, et al.; Optics Letters, Vol. 23, Issue 13, pp. 992-994 (1998)] to use a weakly conducting material distributed in the optical aperture in order to control the voltage distribution between the edges and the center of the optical aperture by modulating the frequency of the control signals.

This type of lens, called an adaptive lens, has the advantage of having a variable focal length that can be rapidly changed using simple electrical means applying a voltage signal to the electrodes, the signal possibly having various frequencies. A converging lens is obtained the focal point of which lies along the optical axis.

Although this type of lens allows the focal distance along the optical axis to be varied as a function of the control voltage and frequency, it does not enable three-dimensional control of the focal point to be obtained allowing the direction of the optical beam to be shifted and thus the beam scan angular range of the device to be increased.

BRIEF SUMMARY OF THE INVENTION

The aim of the present invention is to overcome these drawbacks and provide an optically variable device allowing optical phase to be varied so as to improve the optical quality of the image.

For this purpose, the optically variable device such as described above is characterized in that the material has a sheet resistance of between 10 kΩ/square and 10 GΩ/square and in that at least the first electrode is divided into a number of portions forming subelectrodes suited to receiving different potentials at the same time.

By virtue of these features, the invention makes it possible to vary the electric field between the electrodes and therefore to shift the direction of the optical beam. Thus signals having different frequencies and voltages may be applied in order to generate an electric potential with a more complex surface-density profile resulting in wavefronts with asymmetric and complex shapes.

The present invention may also be used to correct aberrations or in contrast deform the wavefront depending on the intended application and the desired effects.

In addition, by virtue of the use of a sufficiently resistive material (sheet resistance higher than 10 MΩ/square) able to receive high-frequency signals, and the sheet resistance of which is uniform in the layer of said material, problems associated with material layers used in the prior art are solved. Specifically, prior-art materials are subject to problems with the uniformity of their sheet resistance and do not allow an electric-field gradient to be obtained in lenses with pupils smaller than 5 mm. By virtue of the features mentioned above, the device can be used in lenses with very small diameter optical apertures, especially lenses with apertures smaller than 2 mm in diameter.

According to other features:
- the layer of material filling the optical aperture is composed of a mixture of poly(3,4-ethylene dioxythiophene), poly(styrene sulfonate) and polyvinyl alcohol. This material has the advantage of providing a layer of resistive material that can accept high-frequency signals and that has a uniform conductivity. In addition, it allows the optically variable device according to the invention to be produced with a controllable and repeatable manufacturing process and allows aberrations to be better controlled;
- the second electrode is divided into subelectrodes identically to the first electrode and is placed facing the first electrode;
- the optical aperture is substantially circular;
- the axes bounding the subelectrodes open onto the circumference of the optical aperture so as to bound between them circular arcs, of the optical aperture, of substantially the same length;
- the material furthermore comprises a sheet-resistance-promoting agent, such as ethylene glycol or dimethylformamide, so as to increase the sheet conductance of the material;
- the material comprises an adhesion-promoting agent, such as tetraethoxysilane, so as to improve the adherence of the material to the substrates;
- the device comprises an anchoring layer made of a material that anchors the liquid crystal in a planar or homeotropic position;

a resistive ring, bounding the optical aperture and controlled by the subelectrodes, is placed on each substrate plate;

the subelectrodes are thin metal electrodes that are substantially strip shaped; and the first and second electrodes each consist of a number of thin metal subelectrodes connected, at one end, to the resistive ring and, at the other end, opening onto one of the edges of the substrate plate.

The invention also relates to an optical assembly comprising two optically variable devices stacked one on top of the other so that their anchoring directions are perpendicular.

According to other features:

the optical assembly comprises two optically variable devices stacked one on top of the other so that their anchoring directions are parallel;

the optical assembly comprises a number of optically variable devices arranged in a planar array;

signals having the same amplitude and frequency characteristics are simultaneously applied to the electrodes so as to control the optically variable devices; and signals having different amplitude, phase and frequency characteristics are independently applied to the electrodes so as to control the optically variable devices.

BRIEF DESCRIPTION OF THE SEVERAL VIEWS OF THE DRAWINGS

The present invention will be better understood on reading the following detailed description given based on the appended drawings in which:

FIG. 1 shows a schematic perspective view of a liquid-crystal lens according to the invention;

FIG. 2 shows a top view of the lens illustrated in FIG. 1;

FIG. 3 shows a cross-sectional view in the plane A-A through the lens illustrated in FIG. 2;

FIG. 4 shows a perspective view of the electrodes of the lens illustrated in FIGS. 1 to 3;

FIG. 5 shows a top view of the first electrode divided into a number of portions according to a variant embodiment of the invention;

FIG. 6 shows how the voltage distribution varies when control signals of various frequencies are applied to the electrodes;

DETAILED DESCRIPTION OF THE INVENTION

Figure 7:
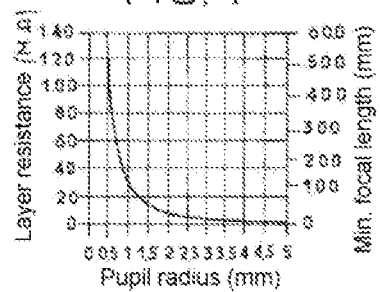
FIGS. 7 and 8 respectively show graphs of the resistance required for the material layer as a function of lens radius, and the variation of the focal length as a function of the frequency of the control signal.

The present invention is applicable to the imaging field and allows better control of the optical quality of an image to be displayed by a unit equipped with a device according to the invention.

The optically variable device 10 according to the present invention is a lens comprising a liquid-crystal element 12 having optical properties controlling the propagation of light. The liquid-crystal element 12 consists of a liquid crystal, for example a nematic liquid crystal, having molecules that are initially oriented about the same average direction. These molecules have an anisotropic dielectric permittivity and a positive or negative birefringence. The molecules therefore have the ability to turn to lie parallel or perpendicular, respectively, to the electric field E that is applied to them. The liquid crystal 12 modifies the polarization of light.

According to a variant embodiment, it is possible to use a blue-phase cholesteric liquid crystal, thereby allowing the device to operate with unpolarized light.

The optically variable device furthermore comprises two transparent substrates 14, 16 (for example made of glass, plastic, quarts, etc.). Each substrate 14, 16 is covered with an opaque or transparent metal (Cr, Al, Au, etc) or semiconductor (ITO, etc.) layer forming a control electrode 18, 20 that has, substantially in its center, a circular aperture called the optical aperture 22, 24, which has a center. A layer of a transparent resistive material 26, 28 is applied to the optical aperture of each electrode so as to fill said aperture. FIG. 3 illustrates a cross-sectional view of a device according to the invention, in which the various constituent elements of the device 10 may be seen.

For given resistive-layer 26, 28 and liquid-crystal 12 parameters, it is possible to control the voltage distribution between the electrodes by modulating the frequency of the signal applied thereto. This distribution is illustrated by FIG. 6 showing graphs of the variation in the electric potential in the resistive layer for various applied frequencies. It may be seen in this figure that the higher the frequency becomes (f4<f3<f2<f1), the lower the voltage in the central region of the lens drops.

This frequency-controlled electric-potential distribution allows a variable electric-field E gradient to be generated in the liquid crystal 12. The electric-field E distribution creates a gradient in the orientation of the molecules of the liquid crystal 12. The liquid crystal 12 thus oriented is considered by a light ray polarized parallel to the long axis of the molecules as an index-gradient medium. The lens 10 formed by the device therefore has controllable focal properties.

The layer of material 26, 28 has a resistivity, depending on the diameter of the optical aperture, of between 10 kΩ/square and 10 GΩ/square. It is comparable to a resistive electrode. Preferably, the material 26, 28 has a sheet resistance higher than 10 MΩ/square and may therefore be used in very small lenses, for example in microcameras. This material 26, 28 allows the lens to be freed from size constraints and allows images to be obtained with very small pupils. This material 26, 28 may be subjected to high-frequency signals because of its high resistivity.

The layer of material 26, 28 filling the optical aperture 22, 24 has a very uniform sheet resistance, thereby leading to homogenous conduction of current and a homogenous electric-potential distribution, ensuring a regular wavefront and preventing deformation of the wavefront due to the surface finish. The material 26, 28 is suited to being placed uniformly in the optical aperture 22, 24, making it possible to obtain a homogenous distribution in the potential. The term "uniform" is understood to mean that there are no discontinuities in the sheet resistance of the material in the volume or area that it bounds.

To obtain a material with a sheet resistance higher than 10 MΩ/square, the electrical sheet resistance being uniform enough to obtain a uniform potential distribution when a voltage is applied across the terminals of the layer, the following conditions must be met: the initial solution of the material must be homogenous and the layer obtained after baking must have a constant thickness.

The first condition is satisfied by producing a solution under constant stirring and then filtering if through a filter with a pore size smaller than 1 μm, in order to guarantee the absence of substantial aggregates that would greatly increase the local sheet resistance. In addition, the layer must be distributed uniformly over the substrate covered with the electrode. This result may be obtained by spin-coating and/or by adding a solvent such as ethylene glycol, which makes it possible to modify how molecules are organised in the material and to obtain a homogenous deposition on the surface of the substrate.

As indicated above, the layer of the resistive material 26, 28 allows the distribution of the voltage to be controlled and allows an electric-field-gradient effect to be obtained in the liquid-crystal layer by frequency modulation. The device 10 acts as a low-pass device in that only low-frequency signals may pass between the electrodes 18, 20. If the frequencies increase, the voltage will vary between the two electrodes 18, 20, creating an electric-field E gradient. The higher the frequency of the signal, the less the voltage propagates toward the center of the cell and the greater the electric-field E gradient between the edges and the center of the pupil, thus allowing a larger range of controllable electric-field E gradients to be obtained.

As may be seen in appended FIGS. 1 and 5, the first and/or the second electrodes 18, 20 of the device 10 are divided into a number of portions forming subelectrodes 18'a, 18'b, 18'c, 18'd and/or 20'a, 20'b, 20'c, 20'd suited to receiving different potentials at the same time. The control electrodes 18, 20 of each substrate 14, 16 may be divided into 2, 3, 4, 6 or 8 portions, as shown in FIG. 5. The division is achieved such that the axes bounding the subelectrodes open onto the circumference of the optical aperture and bound circular arcs. The axes bounding the subelectrodes are such that the electrode is divided into N subelectrodes and the circumference of the optical aperture is divided into N circular arcs of identical length. The distance separating each subelectrode 18' 20' is 1 μm or more. This distance is suited to the resistance of the resistive material and to the voltages applied, in order to prevent local deterioration of the material.

According to a variant, it is possible to remove the resistive material in the space between the electrodes, for example using dry etching techniques, the space between the electrodes then possibly being made smaller than 1 μm in size.

In the case where the two electrodes 18, 20 are divided, they are done so identically and are placed mutually facing so that each subelectrode 18' of the first electrode 18 is placed opposite and is associated with an identical subelectrode 20' of the second electrode 20.

Applying voltages of various values to the subelectrodes 18', 20' allows the distribution of the electric field E in the liquid-crystal element 12 to be varied. This results in the optical beam transmitted being deflected.

Applying electrical signals with varying but identical frequencies and voltages to all the metal subelectrodes 18', 20' allows the position of the focal point along the optical axis to be controlled, such that the optical function is that of a converging lens. The corresponding phase profile is that of a spherical cap with a variable radius of curvature.

Applying signals of different amplitudes and frequencies to each pair of superposed subelectrodes 18', 20' deflects the focal point from the optical axis in a plane perpendicular to the optical axis. This allows the peak of the aforementioned spherical cap to be shifted. It is thus possible to provide for three-dimensional control of the spherical cap forming the lens.

When a different signal, resulting from a combination of frequencies, is applied to each pair of subelectrodes 18', 20', it allows complex nonuniform profiles to be generated producing a phase profile corresponding to that of a deformed cap having a complex shape with discontinuously variable hollows and bumps. This type of lens is especially used for shaping laser beams and for collecting optical aberrations.

Figure 8:
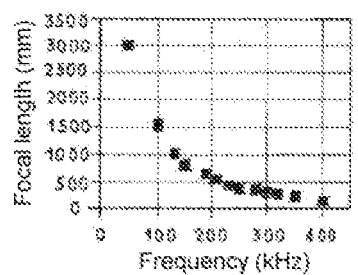
Figure 9:
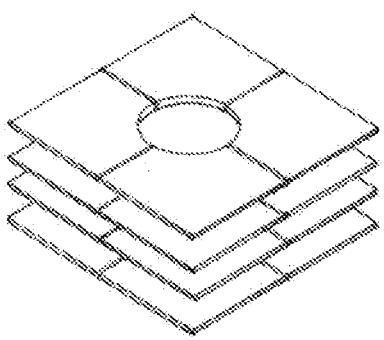
FIGS. 9 to 12 are similar views to FIGS. 1 to 4 of an optical assembly according to the invention.
Figure 12:
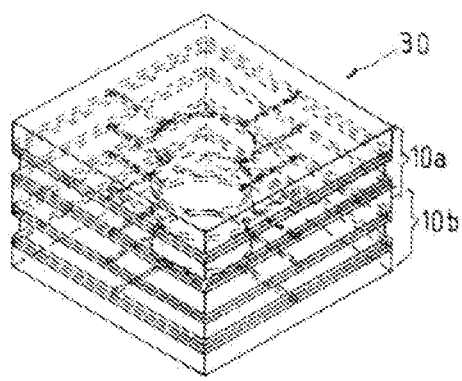
Figure 10:
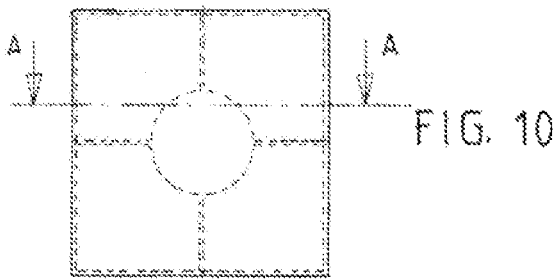
Figure 11:
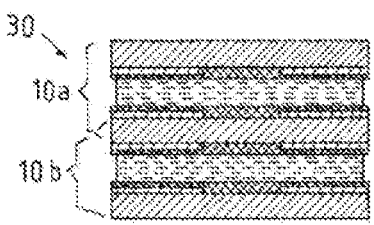

FIGS. 7 and 8 respectively illustrate a graph of the necessary resistance of the material as a function of the radius of the lens, and a graph of the variation in the focal length as a function of the frequency of the control signals. It may be seen in these figures that, for lenses with very small diameters (<0.5 mm), the material must have a high resistance and that lenses with small diameters have a very short focal length. In addition, FIG. 8 shows that, for a very small focal length, the frequency of the signals producing a variation in the focal length can be very high (>400 kHz).

Associating two electrodes 18, 20 separated by a very resistive material 26, 28 allows the lens to be freed from its size constraints, and allows images to be formed using very small pupils, the diameter of which is smaller than 2 mm, via three-dimensional control of the focal point.

The lens 10 according to the invention makes it possible to improve image stability and may be used, for example, as an electroactive element in an imaging objective. It may also be used to shape laser beams or in any application that requires variable-focal-length optical lenses. Associating variable-focal-length and beam-shifting lenses allows a miniature autofocus device with an angle-correction function to be obtained, this combination of features enables microcameras and adaptive endoscope heads.

According to a preferred embodiment, the material 26, 28 in the optical aperture may be a transparent conductive polymer, i.e. PEDOT-PSS, polyaniline, polypyrrole, etc. For example, the material 26, 28 placed between the electrodes 18, 20 is composed of a mixture of poly(3,4-ethylene dioxythiophene) poly(styrene sulfonate) and polyvinyl alcohol. This material 26, 28 is suited to being deposited in a uniform layer, which is necessary if the potential is to be uniformly distributed, and may be used to produce low-aberration ($\lambda/20$) liquid-crystal-comprising adaptive lenses of between 0.5 and 10 mm in diameter and with short focal lengths (1 mm to infinity).

In addition, it is sufficiently resistive to support the high-frequency signals required for lenses with very small pupils.

The device according to the invention is manufactured in the following way:

Each substrate 14, 16 is covered with a metal layer forming an electrode 18, 20 such as described above. At least one of the electrodes 18, 20 is divided into a number of subelectrodes 18', 20' using a conventional etching process, for example by photolithography or laser ablation. The optical aperture 22, 24 bounded by the electrode 18, 20 receives the layer of weakly conductive material 26, 28. According to a previously described embodiment, the material consists of a mixture of poly(3,4-ethylene dioxythiophene) poly(styrene sulfonate) (PEDOT-PSS) and polyvinyl alcohol (PVA).

The material 26, 28 PEDOT-PSS is deposited on the substrates using a deposition technique known in the field of polymer engineering, such as spin-coating or spray-coating, or alternatively printing.

The assembly is then dried at 100° C., for example in an oven.

After drying, an adhesive/spacer mixture is distributed around the optical aperture 22 of one of the substrates 14. These spacers are for example spheres of a calibrated diameter, for example from 1 to 200 microns. They are for example made of plastic, silica or alumina. According to another method, the thickness is set by etching pads in a photoresist.

The second substrate 16 is then superposed on the first substrate 14, so that the optical apertures 22, 24 of each of the substrates 14, 16 are precisely aligned facing one another, and separated by a distance set by the spacers. Each subelectrode 20' of the second electrode 20 is placed feeing the corresponding subelectrode 18' of the first electrode 18.

The assembly is sealed, for example by setting the adhesive, either by UV-curing or by drying in an oven.

The liquid-crystal element 12 is introduced into the cavity formed between the two substrates either by capillary action or suction. Next, a linear polarizer may be positioned at the entrance or exit of the lens, the polarizer being oriented parallel to the anchoring direction. This polarizer enables selection of polarized light oriented parallel to the anchoring direction.

According to a variant embodiment, the conductance of the PEDOT-PSS layer may be increased by adding a sheet-resistance-promoting agent to the PEDOT-PSS solution. This promoting agent is for example ethylene glycol (EG) or dimethylformamide (DMF). By virtue of these agents it is possible to vary the sheet resistance of the material and thus tailor its properties in order to obtain an electric-field gradient in the liquid-crystal element whatever the diameter of the circular aperture.

The addition of PVA allows the sheet resistance of the deposited material to be reduced and made more uniform, thus allowing the potential to be even more uniformly distributed in the material.

The adhesion of the PEDOT-PSS to the substrates may be strengthened by adding an adhesion-promoting agent such as tetraethoxysilane.

Before the spacer-placing step, a planar anchoring treatment may be carried out on the material, if the latter can withstand such a treatment. The treatment consists of a mechanical action (for example brushing of the surface) allowing the molecules of the liquid crystal to be aligned parallel to one another. In the case where a liquid crystal with positive-birefringence properties is used, the PEDOT-PSS layers are subsequently brushed with a nylon-covered roller so as to obtain planar anchoring of the liquid crystal, i.e. anchoring parallel to the substrates. The anchoring treatments may be carried out in other ways, for example by depositing an additional layer of a photoalignable polymer.

If the liquid crystal used has a negative birefringence, a suitable material, a silane for example, needs to be deposited in order for the anchoring of the liquid crystal to be homeotropic, i.e. perpendicular to the substrates.

Otherwise the device will comprise an anchoring layer, i.e. a layer of another material (polyimide, PVA, etc.) that can withstand the anchoring treatment, deposited on the resistive electrode, and an anchoring treatment will be carried out so as to anchor the liquid crystal in a planar or homeotropic position.

The manufacturing techniques described above can be easily industrialized. All the steps are performed on the wafer level, i.e. they are manufacturing techniques developed for microelectronics where the wafer is a disk of silicon or glass on which photolithography is used to etch electronic components (transistors, resistors, etc.) or optoelectronic components (miniature lenses, OLEDs, etc.), respectively. This enables parallel processing and thus efficiency savings. These manufacturing techniques may be used in and tailored to massively parallel production systems.

According to one particular embodiment, it is possible to apply a specific material that anchors the liquid crystal in a homeotropic position, i.e. perpendicular to the substrates 14, 16.

When the liquid-crystal molecules are oriented in a direction inclined at an angle to the polarization of the light, the birefringence of the liquid crystal, i.e. its property of producing double refraction of the light, may be negative or positive. In the case where the liquid crystal 12 has a negative birefringence, the application of electrical signals that have variable voltages and frequencies, but that are identical, to all the subelectrodes 18', 20' allows the position of the focal point along the optical axis to be controlled such that the optical function is that of a diverging lens.

It is possible to apply, to this diverging lens, signals that have amplitudes and voltages that differ between each pair of superposed subelectrodes 18', 20', allowing the optical focal point to be deflected in a plane perpendicular the axis, as was described above.

The invention also relates to an optical assembly 30 consisting of a number of optically variable devices 10a, 10b, joined together.

According to a first embodiment, which is shown in FIGS. 9 to 12, it is possible to superpose a number of optically variable devices 10a, 10b, according to the invention, by aligning the center of their apertures.

According to a first variant of the first embodiment, the stacked lenses are converging lenses and their anchoring directions, i.e. the directions of orientation of their liquid crystals, are perpendicular to one another.

When identical control signals are applied to each lens in this first variant, the assembly thus formed becomes a polarization-insensitive lens with a variable focal length. In this case, the polarizer must be removed. In addition, the space between the two devices must be much smaller than the minimum focal length.

When, in this first variant, different control signals are applied to each lens, the assembly thus formed becomes two variable-focal-length lenses. The light is separated into two portions having perpendicular polarizations (lying parallel to the anchoring direction of each lens) focused on two different points.

According to a second variant of the first embodiment, in the case where the stacked lenses are converging lenses and their anchoring directions are parallel, and when the signals applied to each lens are different, the assembly thus formed becomes two variable-focal-length lenses acting on the same polarization, each lens having a different focal length. A single polarizer is required for both lenses.

According to a third variant embodiment, in the case where the assembly comprises a converging lens associated with a diverging lens in an imaging objective, the assembly has the properties of a miniature zoom.

According to a second embodiment, a number of devices according to the invention may be associated in a planar array with a defined pitch.

According to a first variant of the second embodiment, the optically variable devices may be simultaneously controlled, i.e. the phase, amplitude and frequency of the signals applied to each device are equal.

According to a second variant of the second embodiment, the devices are controlled independently, i.e. the phase, amplitude and frequency of the signals applied to each device are independent.

Placing a number of devices in an array enables probing of matter and near-field imaging of surfaces.

Figure 13:
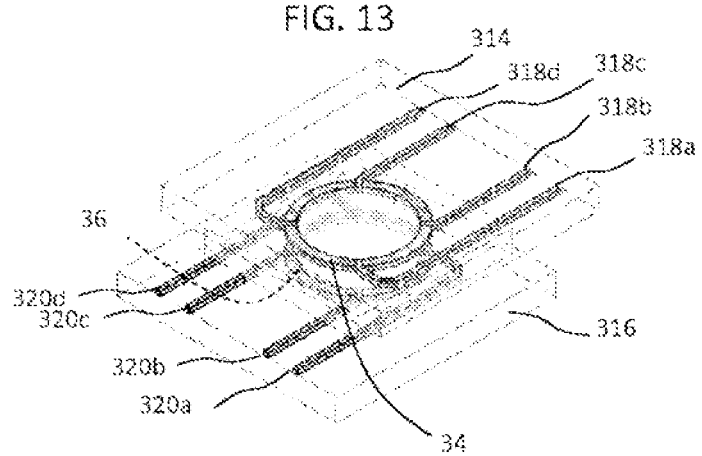
FIG. 13 shows a perspective view of a third embodiment of the invention.
Figure 14:
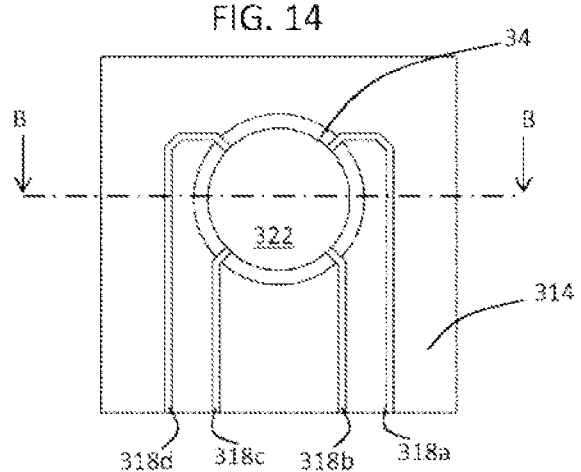
FIG. 14 shows a bottom view of the substrate according to the third embodiment.
Figure 15:
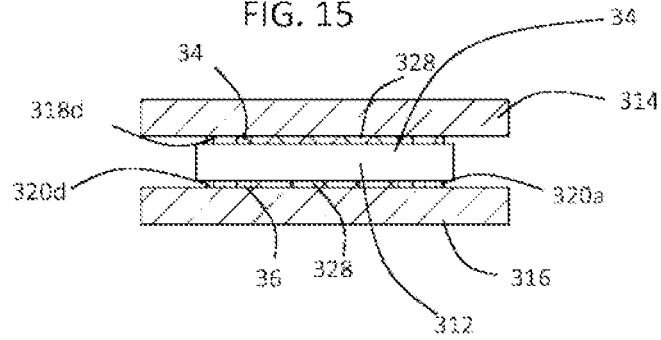
FIG. 15 shows a cross-sectional view in the plane B-B through the lens illustrated in FIG. 13.
Figure 16:
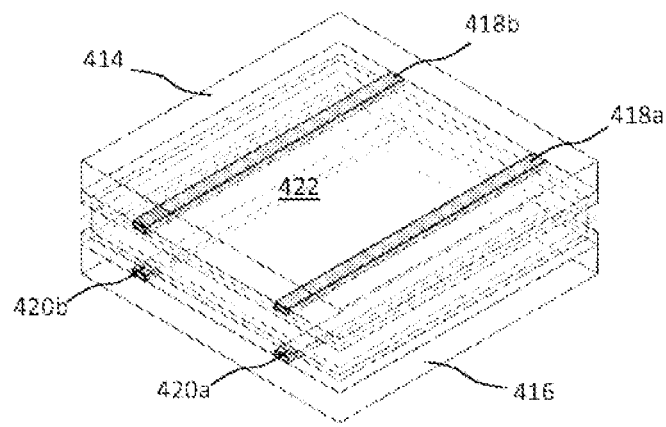
FIGS. 16 to 18 respectively show a perspective view, a top view and a cross-sectional view in the plane C-C, of a fourth embodiment.
Figure 17:
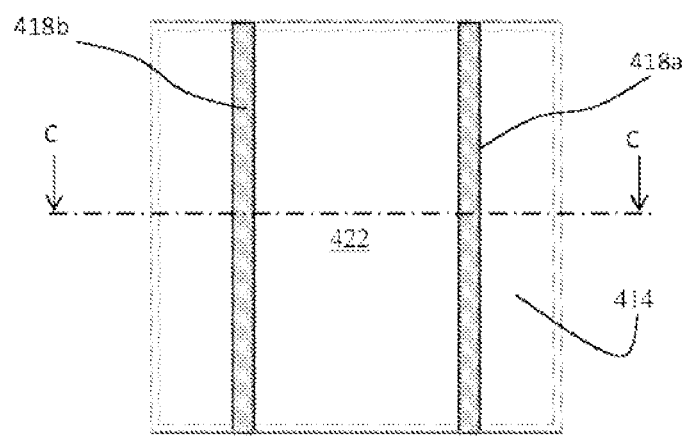
Figure 18:
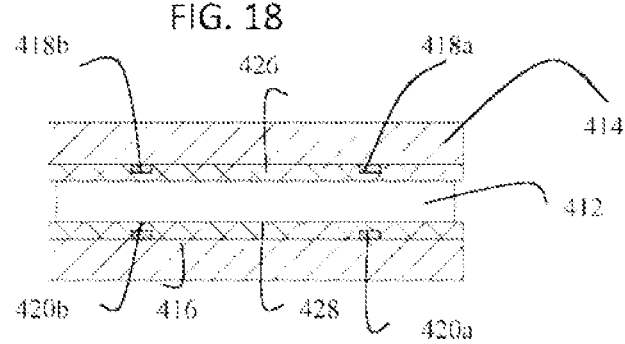

According to a third embodiment, illustrated in FIGS. 13 to 15, the resistive pupil, formed by the optical aperture 322, is no longer bounded by arcs of various electrodes but by a resistive ring (34, 36).

The resistive ring (34,36) is controlled by thin metal subelectrodes (318a, 318b, 318c, 318d, 320a, 320b, 320c, 320d). Each subelectrode (318a to 318d, 320a to 320d) takes the form of a strip connected at one end to the resistive ring (34, 36) so as to bound between them portions of the resistive ring (34, 36) taking the form of circular arcs of substantially the same length. As shown in FIGS. 13 to 15, the optically variable device comprises four subelectrodes bounding, at one end, four substantially equal circular arcs, and, at the other end, opening on to a given edge of the substrate plate on which the subelectrodes are placed.

The resistive ring (34, 36) allows the electric potential to be uniformly distributed at the surface of the layer of material (326, 328) placed in the optical aperture. The resistive ring (34, 36) allows the electrical voltage between each thin metal electrode (318a to 318d, 320a to 320d) to be linearized. It allows the electrical continuity between the subelectrodes (318a to 318d, 320a to 320d) to be improved while guaranteeing signal propagation in each arc of the resistive ring, between the subelectrodes.

The optically variable device according to the third embodiment ensures that the subelectrodes (318a to 318d, 320a to 320d) conduct electrical potential, that the electrical potential is linearly distributed in the resistive ring (34, 36) and therefore that the potential in the pupil is uniformly distributed. In addition, it allows the electrical potential distribution in the pupil to be modified by changing the control frequency.

These features are obtained if the thin metal subelectrodes of the optically variable device have almost zero resistance, provided the ring has a sheet resistance of between 1 and 10 Ω/square, the pupil having a sheet resistance of about several MΩ/square. Thus, when the frequency of the signal applied to the device is varied, the frequency change will have no impact on the linear distribution of the potential in the resistive ring, but will only impact the potential distribution in the pupil.

As indicated for the first embodiment, the layer of material (326, 328) used in the pupil may be a transparent conductor: PEDOT-PSS, polyaniline, polypyrrole, etc. The material does not necessarily need to be transparent because it bounds the optical aperture.

The number of subelectrodes in the third embodiment is given merely by way of example and is nonlimiting. According to a fourth embodiment, illustrated in FIGS. 16 to 19, an optically variable device 410 comprises, on each substrate plate 414, 416, an electrode 418, 420 divided into two rectilinear subelectrodes 418a, 418b, 420a, 420b placed in parallel. The subelectrodes of a given substrate plate 414, 416 bound an optical aperture 422, 424 of substantially rectangular shape defining a cylindrical lens. The subelectrodes 418a, 418b, 420a, 420b are designed to receive different potentials at the same time. This configuration allows a cylindrical variable-focal-length lens function to be associated with a variable-angle prism function.

The fourth embodiment functions in the same way as those described above. Specifically, voltages of various values applied to the subelectrodes 418a, 418b, 420a, 420b allow the electric-field E distribution in the liquid-crystal element 412 to be modified. As a result, the optical beam transmitted is deflected along the axis perpendicular to the axes of the electrodes.

Applying electrical signals of variable but identical voltage and frequency to all the metal subelectrodes 418a, 418b, 420a, 420b of a given substrate 414, 416 allows the position of the focal point along the optical axis to be controlled, such that the optical function is that of a cylindrical converging lens. The corresponding phase profile is that of a cylindrical cap or arch, the radius of curvature of which may vary.

When signals of different amplitudes and frequencies are applied to each pair of superposed subelectrodes (418a, 420a) and (418b, 420b), the focal point may he deflected from the optical axis in a plane perpendicular to the optical axis. This allows the peak of the aforementioned cylindrical cap to be shifted relative to the axes of the subelectrodes.

When a different signal, resulting from a combination of frequencies, is applied to each pair of superposed subelectrodes (418a, 420a) and (418b, 420b), complex nonuniform profiles may be generated producing a phase profile corresponding to that of a deformed cap having a complex shape with discontinuously variable hollows and bumps. This type of lens is especially used for shaping laser beams and for correcting optical aberrations.

Figure 19:
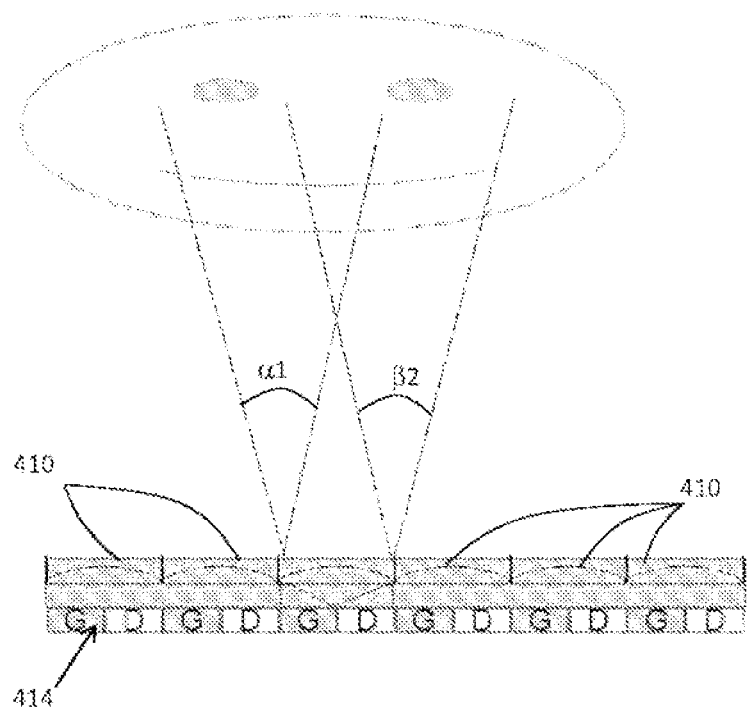
FIGS. 19 and 20 show simplified schematics of an optical assembly comprising a number of devices according to the fourth embodiment.
Figure 20:
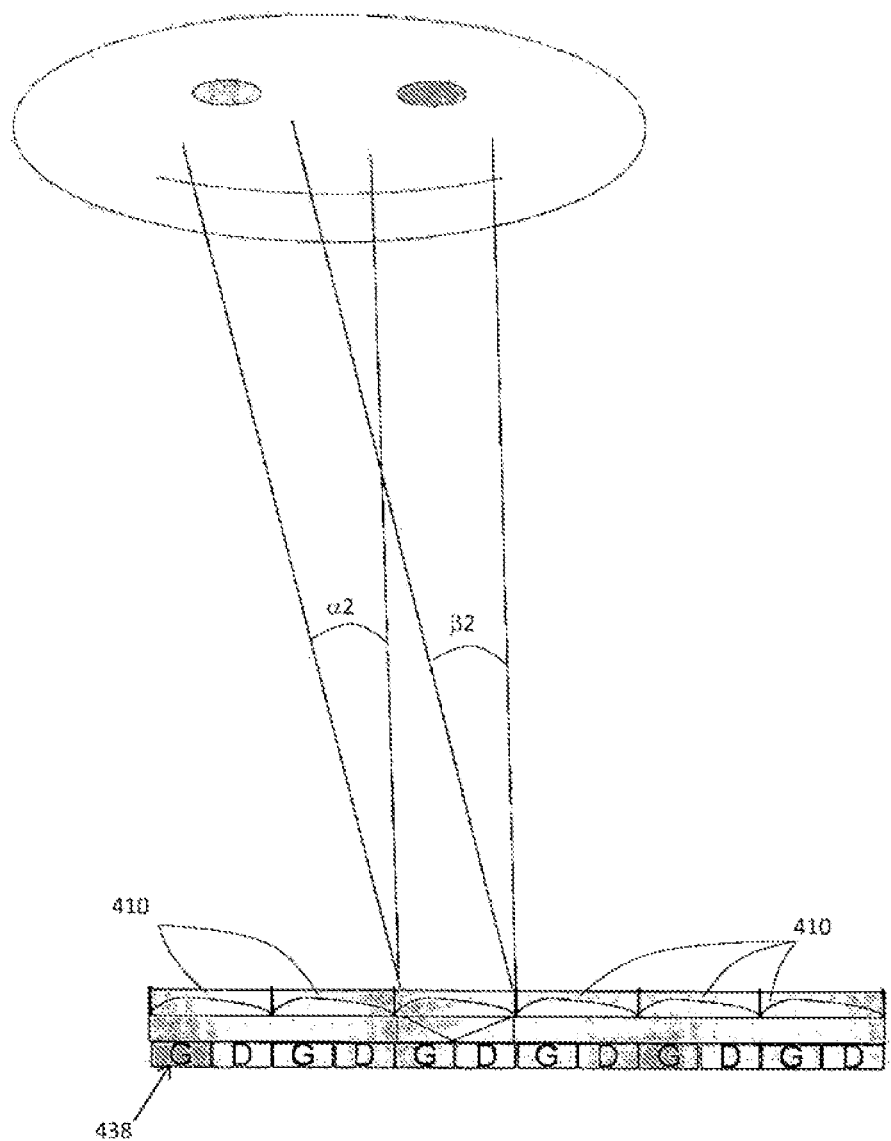

An optical assembly comprising devices according to the fourth embodiment is illustrated in FIGS. 19 and 20. In this optical assembly, a number of optically variable devices 410 are placed so that the rectangular optical apertures 422, 424 may be arranged in an array. The optical function thus provided is an adjustable lens array.

Each element of the array may be individually controlled by a control means or controlled globally by this means in the same way as its neighbors. Such a variable lens array may be combined with a conventional LCD display 438 to provide an autostereoscopic display function (i.e. a display giving the impression of a three-dimensional relief without glasses being required) that is switchable (so as to switch from a simple 2D display to a 3D display) and in order to allow the addition of a function that enables the 3D display to be tailored to the position of the viewer. Specifically, since known autostereoscopic 3D displays use a parallax barrier or lens arrays and cannot follow the viewer, the screen must be observed at a set distance, and at a set angle.

An array of cylindrical lenses according to the fourth embodiment allows the 3D display to be tailored to the position of the viewer, providing that their position, defined by the distance d1, d2 and the angular position (α1, β1, α2, β2) of the observer, relative to the screen 438, has been detected by a specific detection means known to those skilled in the art. A means for controlling the device allows electrical signals having voltages and frequencies suited to modifying the focal length and the prism function of the optically variable devices 410 to be applied so as to deflect the direction of the light beam toward the viewer.

Thus, the focal length of the cylindrical lens will be appropriately set to match the viewer distance, and a prism function will be added, by shifting the optical axis of the cylindrical lens, to match the angular position of the viewer relative to the screen.

The invention is in no way limited to the described and detailed embodiments which have been given merely by way of example.

We claim:

1. An optically variable device allowing the propagation of light to be controlled, comprising;
a liquid-crystal element having optical properties controlling the propagation of light;
two substrate plates placed on either side of the liquid-crystal element, the two substrate plates being covered with a first and a second control electrode, respectively, each electrode bounding an orifice forming a substantially circular optical aperture; and the device furthermore comprising a layer of a material filling the optical aperture bounded by each electrode, characterized in that the layer of material has a uniform sheet resistance of between 10 kΩ/square and 10 GΩ/square, in that at least the first electrode and the second electrode are identically divided into a number of facing portions forming subelectrodes suited to receiving different potentials at the same time, and in that on each substrate plate a resistive ring bounds the optical aperture and is controlled by the subelectrodes.

2. The optically variable device of claim 1, in which the material has a sheet resistance, uniform in the layer of said material, higher than 10 MΩ/square.

3. The optically variable device as claimed in claim 1, in which the layer of material filling the optical aperture is composed of a mixture of poly(3,4-ethylene dioxythiophene), poly(styrene sulfonate) and polyvinyl alcohol.

4. The optically variable device as claimed in claim 1, in which the subelectrodes are bounded by axes that open onto the circumference of the optical aperture so as to bound between them circular arcs of substantially the same length.

5. The optically variable device as claimed in claim 1, in which the subelectrodes are thin metal electrodes that are substantially strip shaped.

6. The optically variable device as claimed in claim 5, in which the first and second electrodes each comprise of a number of thin metal subelectrodes connected, at one end, to the resistive ring and, at the other end, opening onto one of the edges of the substrate plate.

7. The optically variable device as claimed in claim 3, in which the material furthermore comprises a sheet-resistance-promoting agent, such as ethylene glycol or dimethylformamide, so as to increase the sheet resistance of the material.

8. The optically variable device as claimed in claim 1, in which the material comprises an adhesion-promoting agent, such as tetraethoxysilane, so as to improve the adherence of the material to the substrates.

9. The optically variable device as claimed in claim 1, which device comprises an anchoring layer made of a material that anchors the liquid crystal in a planar or homeotropic position.

10. An optical assembly characterized in that it comprises two optically variable devices as claimed in claim 1, stacked one on top of the other so that their anchoring directions are perpendicular.

11. An optical assembly characterized in that it comprises two optically variable devices as claimed in claim 1, stacked one on top of the other so that their anchoring directions are parallel.

12. An optical assembly characterized in that it comprises a number of optically variable devices as claimed in claim 1, arranged in a planar array.

13. The use of an optical assembly as claimed in claim 11, in which signals having the same amplitude and frequency characteristics are simultaneously applied to the electrodes so as to control the optically variable devices.

14. The use of an optical assembly as claimed in claim 11, in which signals having different amplitude, phase and frequency characteristics are independently applied to the electrodes so as to control the optically variable devices.

15. The optical assembly as claimed in claim 12, furthermore comprising a liquid-crystal display on which the array of optically variable devices is placed in order to provide an autostereoscopic display function, and in that it furthermore comprises a means for detecting the angular position of and the distance to a user relative to the display, and a device-controlling means allowing electrical signals of suitable voltage and frequency to be applied so as to modify the focus and the prism function of the optically variable device in order to direct the light beam toward the user.

16. A process for manufacturing an optically variable device as claimed in claim 1, characterized in that it comprises the following steps:

providing two transparent substrates;

depositing a metal layer, forming an electrode, on each substrate;

dividing at least one electrode layer into a number of subelectrodes using a conventional etching operation;

depositing the material on the substrates by spin-coating, spraying or printing;

drying the substrates at 100° C., preferably in an oven;

carrying out a planar or homeotropic anchoring treatment;

placing adhesives and spacers around the optical aperture of the first substrate superposing the second substrate so that the optical apertures are placed mutually facing;

sealing the device by setting the adhesive either by curing it or by drying it in an oven;

inserting a liquid-crystal element between the two substrates by capillary action or suction; and fitting a linear polarizer at the entrance or exit of the lens, the polarizer being oriented parallel to the anchoring direction.

* * * * *